United States Patent
Reisinger et al.

(10) Patent No.: US 12,494,528 B2
(45) Date of Patent: Dec. 9, 2025

(54) CELL HOLDER FOR HOLDING BATTERY CELLS OF A TRACTION BATTERY

(71) Applicant: MAHLE International GmbH, Stuttgart (DE)

(72) Inventors: Dieter Reisinger, Muehlacker (DE); Dragos-Cristian Iancu, Hitzhofen (DE); Eduard Reimer, Fellbach (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 18/822,078

(22) Filed: Aug. 30, 2024

(65) Prior Publication Data
US 2025/0079558 A1 Mar. 6, 2025

(30) Foreign Application Priority Data
Sep. 1, 2023 (DE) .......................... 102023208439.2

(51) Int. Cl.
| | |
|---|---|
| *H01M 10/653* | (2014.01) |
| *B60L 50/64* | (2019.01) |
| *H01M 10/613* | (2014.01) |
| *H01M 10/625* | (2014.01) |
| *H01M 10/643* | (2014.01) |
| *H01M 50/213* | (2021.01) |
| *H01M 50/291* | (2021.01) |

(52) U.S. Cl.
CPC .......... *H01M 10/653* (2015.04); *B60L 50/64* (2019.02); *H01M 10/613* (2015.04); *H01M 10/625* (2015.04); *H01M 10/643* (2015.04); *H01M 50/213* (2021.01); *H01M 50/291* (2021.01); *H01M 2220/20* (2013.01)

(58) Field of Classification Search
CPC ............. H01M 10/653; H01M 10/613; H01M 10/625; H01M 10/643
See application file for complete search history.

(56) References Cited

U.S. PATENT DOCUMENTS

| | | | |
|---|---|---|---|
| 2005/0202310 A1* | 9/2005 | Yahnker | H01M 50/24 429/62 |
| 2010/0092849 A1* | 4/2010 | Wood | H01M 10/6555 429/120 |

(Continued)

FOREIGN PATENT DOCUMENTS

| | | |
|---|---|---|
| CN | 115117499 A | 9/2022 |
| DE | 102019207207 A1 | 11/2020 |

(Continued)

OTHER PUBLICATIONS

English abstract for CN115117499A.
German Search Report DE-102023208439.2, dated Feb. 6, 2024.
English abstract for DE10 2020 135 014.

*Primary Examiner* — Jonathan G Jelsma
(74) *Attorney, Agent, or Firm* — Fishman Stewart PLLC (57) ABSTRACT

A cell holder for accommodating a plurality of battery cells of a traction battery may include a base body, at least two first receptacles disposed on a first side of the base body, and at least two second receptacles disposed on a second side of the base body opposite the first side. The at least two first receptacles and the at least two second receptacles may each be configured to accommodate a single battery cell of the plurality of battery cells. The cell holder may also include at least one area including a phase change material.

23 Claims, 4 Drawing Sheets

(56) References Cited

U.S. PATENT DOCUMENTS

| | | | |
|---|---|---|---|
| 2018/0358671 A1* | 12/2018 | Halsey | H01M 10/6557 |
| 2019/0386359 A1 | 12/2019 | Lokhorst | |
| 2020/0365932 A1 | 11/2020 | Schaar | |
| 2022/0131206 A1* | 4/2022 | Eichler | B21D 53/045 |
| 2022/0158273 A1* | 5/2022 | Khateeb Razack | H01M 10/617 |
| 2024/0120590 A1* | 4/2024 | Clarabut | H02J 7/0031 |

FOREIGN PATENT DOCUMENTS

| | | |
|---|---|---|
| DE | 102020135014 A1 | 6/2022 |
| WO | 2022087622 A1 | 4/2022 |

\* cited by examiner

CELL HOLDER FOR HOLDING BATTERY CELLS OF A TRACTION BATTERY

CROSS-REFERENCE TO RELATED APPLICATION

This application claims priority to German Patent Application No. DE 102023208439.2, filed on Sep. 1, 2023, the contents of which is hereby incorporated by reference in its entirety.

TECHNICAL FIELD

The present invention relates to a cell holder for accommodating battery cells of a traction battery. The invention also relates to a traction battery for a battery electric vehicle with at least one cell holder.

BACKGROUND

A generic traction battery is known, for example, from DE 10 2020 135 014 A1 and comprises at least one battery module that has several rechargeable electrochemical battery cells. The battery module has a battery housing with a housing interior for accommodating the battery cells and a flat housing base on which the battery cells are directly or indirectly supported. The battery cells are designed as cylindrical round cells such that they each have a longitudinal center axis and two end faces facing away from each other with respect to the longitudinal center axis of the cell. The battery cells are arranged in the housing interior in such a way that their longitudinal center axes run parallel to each other and perpendicular to the housing base, such that the battery cells are each supported directly or indirectly on the housing base via one of the end faces. The battery cells can be pre-assembled in individual cell holders, which are then installed together with the battery cells as a unit in the battery housing. The battery cells accommodated in the cell holder and arranged in the housing interior can be temperature controlled by bringing them into direct thermal contact with a temperature control medium flowing directly around the battery cells. By transferring heat from the battery cells to the temperature control medium, they can be cooled in the sense of immersion cooling. If the battery cells are to be heated, heat can be transferred from the temperature control medium to the battery cells.

It often proves problematic that in the event of uncontrolled thermal bursting of individual or several battery cells—this effect is known to the skilled person as "thermal runaway"—a large amount of waste heat is generated within a short period of time, which must be dissipated in order to avoid damaging or even destroying the traction battery. However, the heat transport capacity provided by the temperature control medium in question often proves to be insufficient for this purpose.

SUMMARY

It is therefore a task of the present invention to show new ways in the development of cell holders for accommodating battery cells of a traction battery. In particular, an improved design for a cell holder is to be created which, in the event of a thermal runaway, enables particularly efficient dissipation of waste heat released by the battery cells held in the cell holder. In addition, such an improved cell holder should also be technically simple and therefore inexpensive to manufacture.

According to the invention, this task is solved by the subject matter of the independent patent claim(s). Advantageous embodiments are the subject matter of the dependent patent claim(s).

Accordingly, the basic idea of the invention is to produce a cell holder for accommodating several battery cells of a traction battery from a phase change material in certain areas. In addition to its function as a holder for the individual battery cells, the phase change material also provides the cell holder with the function of a latent heat accumulator—also known to the skilled person as a "phase change accumulator"-which is able to quickly store the thermal energy supplied to it in the form of conversion enthalpy for a phase change, for example from solid to liquid. This enables the cell holder to absorb the released waste heat quickly and almost completely in the event of the aforementioned thermal bursting of a battery cell. Damage to the traction battery caused by the waste heat released during thermal bursting, in particular the spread of thermal bursting to other battery cells, is thus prevented or at least counteracted.

For the mechanically stable mounting of said battery cells, it is proposed to realize the cell holder according to the invention by means of a base body in the form of a grid, in which a plurality of grid openings is provided. This makes it possible to arrange the battery cells to be held on both sides of the base body. In this way, the cell holder requires comparatively little installation space in relation to the number of battery cells it can hold. To accommodate and hold the batteries on the cell holder, first receptacles can be provided on a first of the two sides of the base body and second receptacles can be provided on a second side opposite the first side. These receptacles are realized by a geometry of the base body in the form of a grid, which is adapted to the geometry of the battery cells to be accommodated-typically round cells with a cylindrical geometry. The cell holder presented here therefore does not require any separate receptacle elements in addition to the base body, which simplifies the design of the cell holder. In addition to the phase change material already mentioned, a preferably dimensionally stable, i.e., non-elastic, plastic can be considered as the material for the base body. This means that areas of the base body that are essential for holding the battery cells in place can be made of a rigid and therefore dimensionally stable plastic material and, in particular, do not contain any phase change material. By using plastic as the material for the cell holder, cost savings can also be achieved in the manufacture of the cell holder. In contrast, areas of the base body from which heat is to be absorbed in the sense of a latent heat accumulator can consist of the phase change material.

In the cell holder according to the invention, however, it is also conceivable to manufacture the entire base body from a rigid and thus dimensionally stable material, in particular said plastic material, without using a phase change material, so that the base body does not contain a phase change material in any areas. In this case, the latent heat accumulator essential to the invention is formed by other components of the cell holder that are different from the base body of the cell holder, which in turn contain a phase change material for this purpose or even consist exclusively of such a phase change material.

A further advantage of the cell holder according to the invention is that it can be flexibly designed to accommodate a certain number of battery cells by providing first and second receptacles. By providing two or more such cell holders with respective battery cells, a comparatively large number of battery cells can also be arranged in a mechanically stable manner in a battery housing of the traction battery and held there. For this purpose, the individual battery cells can first be mounted on the respective cell holder and then the cell holders with the battery cells, each as a unit, can be successively inserted into the battery housing. Mounting the individual battery cells on the cell holder is also extremely simple, as the battery cell in question only needs to be placed in the respective receptacle.

The grid openings in the base body allow a temperature control medium to come into direct contact both mechanically and thermally with the battery cells held on the cell holder or accommodated by the cell holder, i.e., the temperature control medium can flow directly around said battery cells. This ensures very good thermal contact between the battery cells and the temperature control medium. The cell holder according to the invention is therefore particularly suitable for temperature control and, in particular, cooling the battery cells held by means of immersion cooling. This enables a reliable flow around all battery cells, particularly in the case of immersion temperature control.

As a result, the measures described above are used to create a cost-effective cell holder that is not only capable of keeping battery cells mechanically stable in the long term, but can also efficiently store the waste heat released in the event of thermal bursting.

In detail, a cell holder according to the invention for accommodating battery cells of a traction battery comprises a base body in the form of a grid and formed in one piece. Several, i.e., at least two, grid openings are formed in the base body. At least two first receptacles, each for accommodating a battery cell, are provided on a first side of the base body. On a second side of the base body, opposite the first side, there are at least two second receptacles, also each for accommodating a battery cell. Both the first and second receptacles can each be formed by a volume that is partially surrounded by the base body in the form of a grid. The battery cell in question is positioned in the corresponding volume for accommodating in the respective receptacle. According to the invention, the cell holder comprises a phase change material in at least one area of the cell holder or comprises such a phase change material in the area of this cell holder.

In a preferred embodiment, in order to realize the functionality of a latent heat accumulator in the at least one area of the cell holder in which the cell holder comprises a phase change material or consists of such a phase change material, the cell holder has at least one heat absorption body which is different from the base body and consists of the phase change material or comprises the phase change material. It is expedient for said heat absorption body to be arranged adjacent to the battery cell from which it is to absorb waste heat in the event of uncontrolled thermal bursting. It is therefore particularly practical for the heat absorption body to be arranged in the area of a first or second receptacle. Ideally, the arrangement of the heat absorption body on the first or second receptacle can be realized in such a way that the heat absorption body rests against the battery cell when it is accommodated in the respective receptacle.

In another preferred embodiment, the base body of the cell holder does not contain any phase change material. The base body can therefore be optimized with regard to stable mechanical properties for stable accommodating and holding of the battery cells. In particular, this ensures that the mechanical integrity of the cell holder is not jeopardized even in the event of thermal bursting and the associated rapid release of a comparatively large amount of heat.

In a further preferred embodiment, the heat absorption body has a sheathing, in particular made of a flexible material, which surrounds an interior in which a filling of phase change material is arranged. Alternatively, the heat absorption body may comprise a laminate which in turn contains or consists of the phase change material.

The filling of the phase change material is particularly preferably in the form of a gel, especially a viscous gel. Alternatively, the filling can be formed by said laminate, which comprises the phase change material or consists of the phase change material.

According to an advantageous further development, the sheathing can be in the form of a bag. Alternatively or additionally, in this further development, the flexible material of the sheathing can be a plastic.

In another preferred embodiment, the sheathing can be firmly connected to the base body, preferably with a material bond.

Particularly preferably, the phase change material can be or comprise organic or inorganic paraffin. Alternatively, other materials that change from a solid to a liquid state at a temperature between 50° C. and 100° C. can be considered.

According to an advantageous further development, at least one heat absorption body can be provided for each of the first and second receptacles present and delimited by the base in body. These heat absorption bodies are then conveniently arranged in the area of the respective receptacle in order to efficiently absorb the heat released by the battery cell.

It is particularly preferable for at least one heat absorption body to be arranged in one of the grid openings provided on the base body.

However, it is also conceivable that the base body consists of a phase change material in sections or comprises such a phase change material in sections. In this scenario, certain areas or sections of the base body are then formed by phase change material, and the complementary sections or areas do not contain any phase change material. A plastic material, in particular a dimensionally stable and rigid plastic, is suitable for these sections or areas. In this case, it proves advantageous to form sections or areas of the base body that are essential for the stable and permanent fixing of a battery cell without phase change material, and to form those sections or areas of the base body that do not necessarily fulfil a load-bearing function for the battery cells from the phase change material.

The base body of the cell holder according to the invention can preferably consist of a plastic material or comprise such a plastic material. The plastic material is particularly preferably a dimensionally stable or rigid plastic material, such that a dimensionally stable or rigid base body is created.

In a preferred embodiment of the cell holder according to the invention, the base body has a first and a second end wall, which face each other along an axial direction of the base body and axially delimit the first and second receptacles and also the base body. The two end walls are connected to each other by means of a plurality of connecting elements of the base body, which delimit the grid openings at least in sections. Several of the connecting elements each partially delimit at least one first and/or second receptacle. The design of the base body described above makes it possible to make the base body mechanically rigid such that it is able to keep the battery cells permanently mechanically stable in long-term operation, despite the mechanical stresses that typically occur in a battery electric vehicle in the form of knocks and impacts.

In a further preferred embodiment, at least one connecting element consists of a phase change material or comprises such a phase change material. Alternatively or additionally, in this embodiment at least one connecting element may not contain any phase change material. Depending on whether a connecting element performs a load-bearing function or is to be designed to absorb waste heat, it can therefore be made of a phase change material or of a material other than a phase change material, in particular a rigid and therefore dimensionally stable plastic.

It is particularly practical for the first and second receptacles to be arranged alternately one after the other along a longitudinal direction running perpendicular to the axial direction. This arrangement of the receptacles means that the cell holder with the battery cells it holds requires only a small amount of installation space. This in turn makes it possible to arrange a large number of battery cells in a battery housing of the traction battery in a space-saving manner, especially when two or more cell holders according to the invention are used.

It is particularly practical for the first and second receptacles to be arranged alternately one after the other along a longitudinal direction running perpendicular to the axial direction. This arrangement of the receptacles means that the cell holder with the battery cells it holds requires only a small amount of installation space. This in turn makes it possible to arrange a large number of battery cells in a battery housing of the traction battery in a space-saving manner, especially when two or more cell holders according to the invention are used.

It is particularly practical for at least one connecting element to be designed as a connecting strut. By designing the connecting element as a connecting strut, the required installation space is further reduced without compromising the rigidity of the base body. In addition, by designing the connecting elements as connecting struts, the grid openings of the base body, which are essential to the invention and through which a temperature control medium can come into direct contact with the battery cell in question, can be realized in a particularly simple and thus cost-effective manner.

Particularly preferably, at least one of the connecting elements or at least one of the connecting struts either extends along the axial direction or, alternatively, is arranged in a plane that is oriented perpendicular to the axial direction. Preferably, this condition applies to several of the connecting elements. A cage-like geometry of the cell holder or base body can be realized by means of such a geometry, which requires little installation space and yet ensures a stable mounting of the individual battery cells.

According to an advantageous further development of the cell holder according to the invention, at least one tolerance compensation body, preferably made of an elastic material, particularly preferably of an elastomer, can be arranged on the base body facing a respective first or second receptacle. Such a tolerance compensation body can be used to compensate for manufacturing tolerances in the cell holder, but also in the battery cells to be held. The tolerance compensation body can preferably be designed as an elastic foam body. The tolerance compensation body can be preloaded against the battery cell accommodated in a respective first or second receptacle. The tolerance compensation body can preferably be designed in such a way that, when the respective battery cell accommodated in the respective receptacle is pressed in a normal or proper manner parallel to the longitudinal center axis of the cell, the respective elastic tolerance compensation body is elastically deformed or compressed by at least 5%, preferably by at least 10%.

Particularly preferably, at least one tolerance compensation body, facing the respective first or second receptacle, can be arranged on a connecting element or on a connecting strut. Alternatively or additionally, in this variant at least one tolerance compensation body can be arranged on the first or second end wall, facing the respective first or second receptacle. The tolerance compensation body can be easily attached to the connecting element or the end wall during the production of the cell holder or the base body, resulting in cost advantages in the production of the cell holder.

Particularly advantageously, at least one grid opening can have a rectangular or square geometry.

According to an advantageous further development of the cell holder according to the invention, a positioning structure for positioning the cell holder on the battery housing or in the housing interior of the traction battery can protrude from a side of the first end wall facing away from the second end wall. Using the positioning structure, the cell holder can be positioned precisely in the housing interior and held stably on the battery housing or in the housing interior. In particular, the positioning structure can be formed by projections that protrude from the first end wall of the base body. The positioning structure or the protrusions can be integrally formed on the first end wall, which means that the positioning structure or protrusions and the first end wall are formed in one piece and as a single material. The positioning structure can interact with a counter-positioning structure provided on the battery housing of the traction battery according to the invention, in particular on the housing base of the battery housing. The positioning structure and said counter-positioning structure can be designed to complement each other, such that when the cell holder is arranged in the battery housing and supported on the housing base, the positioning structure and the counter-positioning structure form a positive connection.

The invention also relates to a traction battery for a battery electric vehicle. The traction battery comprises at least one battery module, which in turn has several rechargeable electrochemical battery cells, each of which is designed as a cylindrical round cell. Furthermore, the battery module comprises a battery housing that at least partially surrounds a housing interior. Furthermore, the battery module comprises at least one cell holder according to the invention, as presented above, which is arranged in the housing interior and is supported on the battery housing. The advantages of the cell holder according to the invention explained above are therefore transferred to the traction battery according to the invention.

According to the invention, a battery cell of the battery module is arranged in at least one first receptacle and, alternatively or additionally, in at least one second receptacle. Preferably, one battery cell of the battery module can be arranged in each of the first and second receptacles, such that the battery cells of the traction battery are distributed over the first and second receptacles.

With the aid of the cell holder essential to the invention, said battery cells of the traction battery can be mounted in the battery housing in a simple manner, wherein a maximum number of battery cells that can be mounted in the battery housing is essentially determined by the volume of the housing interior.

A particularly advantageous feature of the traction battery according to the invention is that the individual battery cells can initially be pre-assembled on a cell holder according to the invention and, after such pre-assembly, the cell holder including the pre-assembled battery cells can be mounted as a structural unit in the battery housing of the traction battery according to the invention. This considerably simplifies the assembly of the traction battery. In this way, the traction battery according to the invention can flexibly determine how many battery cells a single cell holder should accommodate and how many cell holders with respective battery cells should in turn be accommodated by the battery housing. This provides the skilled person with flexible design options.

According to another advantageous further development, at least two, preferably several, cell holders with respective battery cells can be arranged next to each other in the housing interior.

Preferably, the traction battery can be configured as an immersion temperature controlled traction battery, i.e., designed such that a temperature control path is routed through the battery housing in such a way that a temperature control medium routed in the temperature control path comes into direct contact with the battery cells and can thus absorb heat from the battery cell concerned or release heat to it, depending on whether the battery cell is to be cooled or heated; because, depending on the operating state of the traction battery, it may be necessary to cool or heat the battery cells in order to optimize the performance of the traction battery. A temperature controlled, in particular immersion temperature controlled, traction battery is therefore configured for temperature control of the battery cells such that the battery cells can be cooled or heated as required.

In another preferred embodiment, the base body in the area of the first and second receptacles can rest at least in sections against the battery cell accommodated in the respective receptacle.

It is particularly preferable for at least one heat absorption body to be in contact with a battery cell. This ensures particularly good thermal contact between the heat absorption body and the battery cell so that heat can be efficiently absorbed by the battery cell in the event of thermal bursting. Alternatively or additionally, in this variant at least one connecting element can be in contact with at least one battery cell. In the event that a connecting element consists of or comprises a phase change material, the desired good thermal contact of the connecting element with the battery cell is also achieved in this way. If the material of the connecting element does not contain any phase change material, so that the connecting element fulfils a holding or fixing function, improved fixing of the connecting element in the respective receptacle of the cell holder is achieved in this way. The above also applies if the connecting element is designed as a connecting strut as explained above.

In a preferred embodiment of the traction battery according to the invention, the battery cells communicate fluidically with the housing interior via the through-openings formed in the cell holder, such that temperature control medium guided through the housing interior or in the temperature control path can come into direct contact with the battery cells.

In another preferred embodiment, the base body in the area of the first and second receptacles can rest at least in sections against the battery cell accommodated in the respective receptacle.

In a further preferred embodiment, at least one tolerance compensation body can be preloaded against the battery cell accommodated in the relevant first or second receptacle. This ensures a particularly stable and permanent fixation of the battery cell to the battery holder, even if manufacturing tolerances are present.

In a further preferred embodiment of the traction battery according to the invention, the battery housing comprises one, preferably flat housing base and a housing wall projecting from the housing base, preferably in the form of a collar, which together partially delimit the housing interior. In this further development, the housing wall encloses a housing opening for inserting the cell holders into the housing interior. A positioning counter-structure is formed on the housing base for lateral positioning of the cell holders in the housing interior. The counter-positioning structure can preferably interact with the above-mentioned positioning structure provided on the cell holder and, in particular, form a positive connection with it. Particularly preferably, the counter-positioning structure can be complementary to the positioning structure provided on the cell holder.

The counter-positioning structure can be integrally formed on the housing base of the battery housing, which means that the counter-positioning structure or its protrusions and the housing base are formed in one piece and in the same material. To fix the respective cell holder in the battery housing, the cell holder can be placed on the housing base such that the positioning structure engages with the counter-positioning structure. The positioning structure and the counter-positioning structure can be designed to complement each other, such that the positioning structure and the counter-positioning structure form a positive connection when the cell holder is arranged in the battery housing and the cell holder is supported on the housing base.

According to an advantageous further development, the positioning counter-structure can have several projections, preferably integrally formed on the housing base, projecting from the housing base into the housing interior. This further development is particularly easy to manufacture and therefore offers cost advantages in the production of the traction battery.

Particularly preferably, at least one respective projection can be provided on the housing base for each cell holder arranged in the housing interior.

According to a further advantageous further development, the first end wall of the base body of at least one cell holder can be arranged at a distance from the housing base by means of the positioning contour. The space thus formed between the first end wall and the housing base can form a temperature control channel for the temperature control medium to control the temperature of the battery cells, through which the temperature control medium can flow. In this way, the temperature control medium can be distributed particularly evenly to the individual battery cells arranged in the housing interior, resulting in uniform temperature control of the individual battery cells.

In another preferred embodiment, the battery cells, which are designed as cylindrical round cells, each have a longitudinal center axis and two end faces facing away from each other with respect to the longitudinal center axis of the cell. In this embodiment, the battery cells are arranged in the respective receptacle of the cell holder in such a way that their longitudinal center axes run essentially parallel to each other and perpendicular to the end walls of the cell holder and the battery cells are supported directly or indirectly on the two end walls at the front.

Further important features and advantages of the invention are apparent from the sub-claims, from the drawings, and from the associated description of the figures with reference to the drawings.

It is understood that the above-mentioned features and those to be explained below can be used not only in the combination indicated in each case, but also in other combinations or on their own, without departing from the scope of the invention as defined by the patent claims. The above-mentioned components of a superordinate unit, such as a device, an apparatus, or an arrangement, which are designated separately, can form separate parts or components of this unit or be integral areas or sections of this unit, even if this is shown differently in the drawings.

Preferred exemplary embodiments of the invention are shown in the drawings by way of example and will be explained in more detail in the following description, wherein identical reference numbers refer to identical or similar or functionally identical elements.

BRIEF DESCRIPTION OF THE DRAWINGS

It shows, in each case schematically.

DETAILED DESCRIPTION

Figure 1:
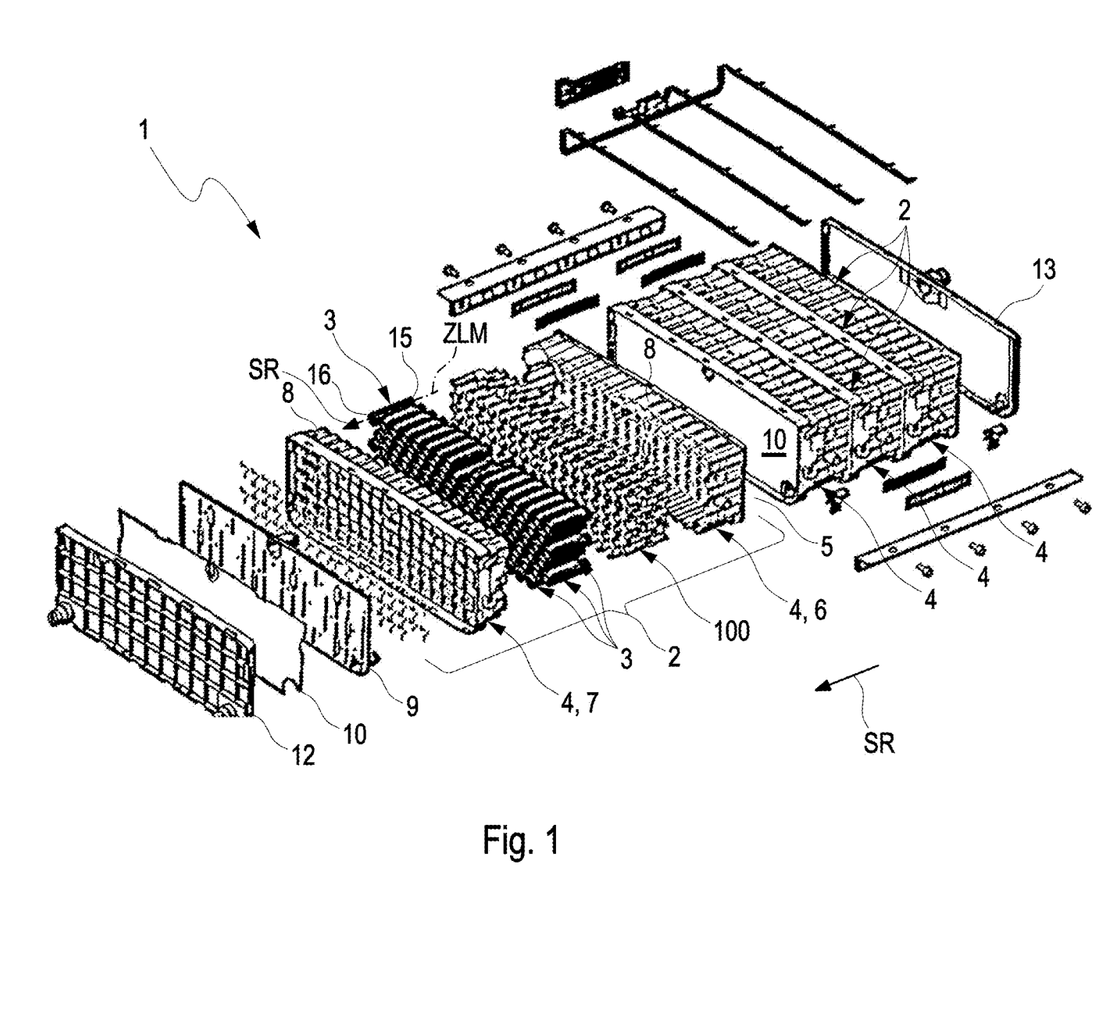
FIG. 1 shows an isometric view of a traction battery with several battery modules stacked together and a disassembled battery module in an isometric exploded view.

According to FIG. 1, a traction battery 1 configured for a battery electric vehicle comprises at least one battery module 2 having a plurality of rechargeable electrochemical battery cells 3. FIG. 1 shows a traction battery 1 with four such battery modules 2, wherein the three battery modules 2 shown on the right are shown in an assembled state and mounted or stacked together. In contrast, the fourth battery module 2 shown on the left is shown pulled apart such that the individual components are recognizable.

The respective battery module 2 has a battery housing 4, which has a housing interior 5 for accommodating the battery cells 3 and a housing base 6. The battery cells 3 are indirectly supported on the housing base 6. The respective battery housing 4 also has a housing cover 7, which is also designed to be flat and lies perpendicular to the housing base 6 opposite the housing base 6. In addition, the battery housing 4 has a housing wall 8, which in the example shown here is integrally formed partly on the housing base 6 and partly on the housing cover 7. The housing wall 8 runs around the housing interior 5 and thus around the battery cells 3 housed in it. A fluid distribution plate 9 and an intermediate plate 10 can be arranged between adjacent battery modules 2. The battery modules 2 are stacked on top of each other along a stacking direction SR. With regard to the stacking direction SR, there is a front end plate 12 and a rear end plate 13 at the longitudinal ends of the traction battery 1. Conveniently, the traction battery 1 is configured as an immersion temperature-controlled traction battery 1, such that a corresponding dielectric temperature control medium, in particular a dielectric fluid, can be supplied and discharged via corresponding connections, which are recognizable, for example, on the rear end plate 13. The fluid distribution plates 9 support a targeted flow through the housing interiors 5 of the battery modules 4 of the traction battery 1, wherein the battery cells 3 come into direct contact with the temperature control medium.

FIG. 1 shows further peripheral components of the traction battery 1, which are not described in detail and can be used, for example, for electrical contacting, fluid distribution, and for fastening the battery modules 2 to each other. The individual battery modules 2 or their battery housings 4 can be appropriately configured in a cuboid shape. In the present context, the term "configuration" is synonymous with the term "design", such that the phrase "configured such that" is synonymous with the phrase "designed such that".

The battery cells 3 are configured in the present case as cylindrical, in particular circular-cylindrical, round cells, each of which has a longitudinal center axis ZLM and two end faces 15 and 16 that face away from each other with respect to the longitudinal center axis ZLM. Furthermore, the battery cells 3 are arranged in the housing interior 5 in such a way that their longitudinal center axes ZLM run parallel to each other and perpendicular to the flat housing base 6. Electrical contact is then usually made with the battery cells 3 on the other or second end face 16, although this is not shown in detail.

As shown in FIG. 1, it is noteworthy that the stacking direction SR, in which the battery modules 2 are attached to one another, runs parallel to the longitudinal center axes ZLM of the battery cells 3. When installed, the traction battery 1 is preferably mounted on the vehicle in such a way that the stacking direction SR extends essentially horizontally, resulting in a horizontal arrangement for the battery cells 3 in the operational traction battery 1 or in the vehicle.

Figure 2:
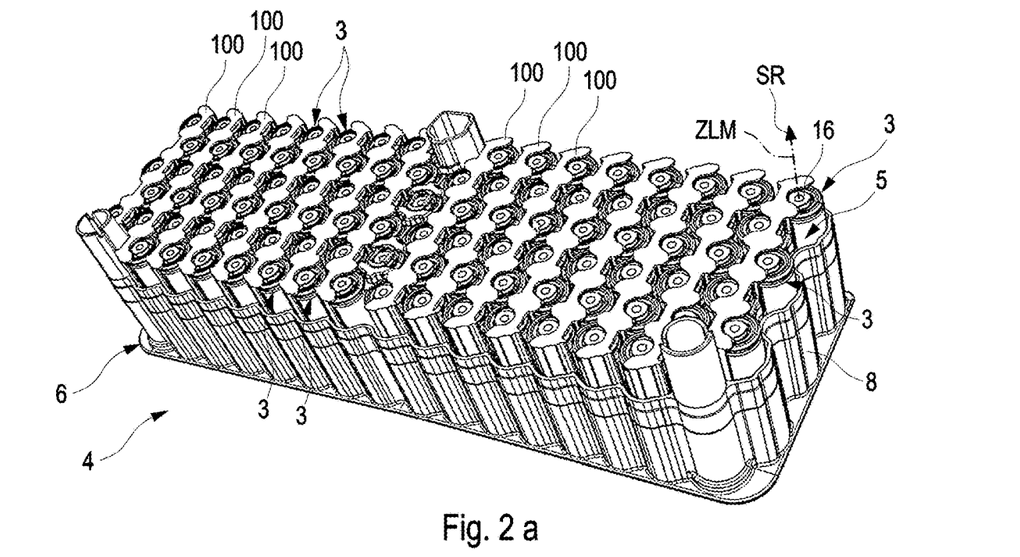
FIG. 2a shows an isometric view of a battery module, only partially shown, with a cell holder according to the invention, with battery cells accommodated therein and with a battery housing for accommodating the cell holders with their battery cells.
FIG. 2b shows an exploded view of the battery module shown in part in FIG. 2a, FIGS. 3a and 3b show an isometric representation of an example of a cell holder according to the invention.

In order to improve the predetermined positioning of the battery cells 3 within the interior 5 of the battery housing 4, a plurality of cell holders 100 according to the invention are used in FIG. 1, each of which interacts with a plurality of battery cells 3 in order to position and hold them in the battery housing 4. FIGS. 2a and 2b illustrate this scenario. FIG. 2a shows a battery housing 4 without a housing cover 7 with several cell holders 100 arranged therein in an isometric view. FIG. 2b is an exploded view of FIG. 2a. The cell holders 100 arranged in the housing interior 5 are each supported on the battery housing.

Figure 3:
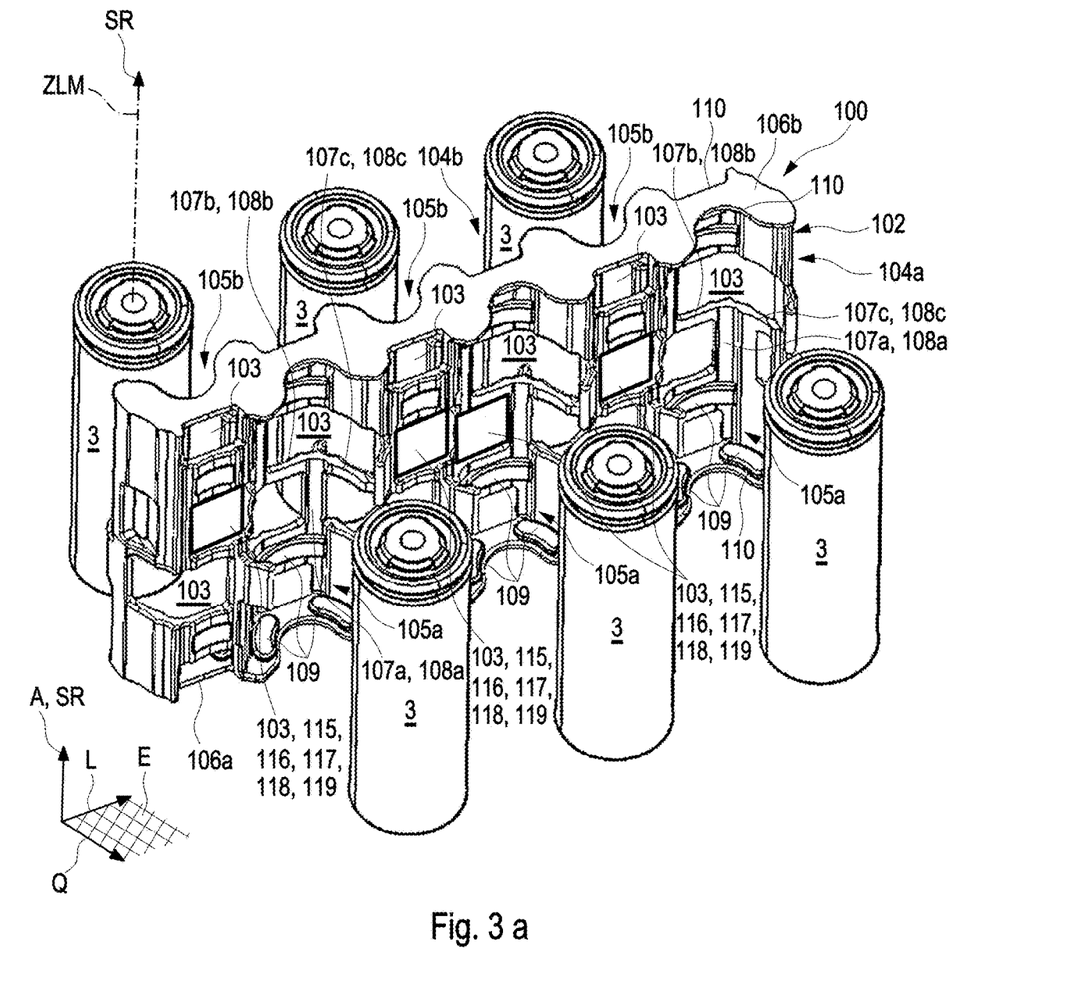

FIGS. 3a and 3b show an isometric representation of an example of an individual cell holder 100 shown in FIGS. 2a and 2b for accommodating the battery cells 3. FIG. 3a shows the battery cells 3 to be accommodated at a distance from the cell holder 3, FIG. 3b in a state accommodated on the cell holder 100.

The cell holder 100 comprises a base body 102 which is in the form of a grid and formed in one piece. Several grid openings 103 are formed in the base body 102. The base body 102 may consist of or comprise a plastic material. Three first receptacles 105a are formed on a first side 104a of the base body 102 to accommodate three battery cells 3. On a second side 105a of the base body 102 opposite the first side 104a, three second receptacles 105b are provided for accommodating three further battery cells 3. The cell holder 100 shown can therefore accommodate six battery cells 3, which are also shown in FIG. 3a, but are shown at a distance from the cell holder 100 to illustrate its structure. In variants of the example, a different number of first or second receptacles 105a, 105b can also be provided. The individual first and second receptacles 105a, 105b can each be designed to partially accommodate the individual battery cells 3, which are each designed as cylindrical round cells, and can be adapted to the cylindrical geometry of the battery cells 3 for this purpose.

According to FIGS. 3a and 3b, the battery cells 3 of the cell holder 100 are distributed over the first and second receptacles 105a, 105b, i.e., each of the battery cells 3 is accommodated or arranged either in one of the first receptacles 105a or in one of the second receptacles 105b.

In the area of the first and second receptacles 105a, 105b, the base body 102 can rest at least in sections against the battery cell 3 accommodated in the respective receptacle 105a, 105b.

According to FIGS. 3a and 3b, the base body 102 further comprises a first and a second end wall 106a, 106b, which are opposite each other along an axial direction A of the base body 102. The two end walls 106a, 106b axially delimit the first receptacles 105a and second receptacles 105b and also the entire base body 102. The two end walls 106a, 106b can—when viewed in a plan view along the axial direction A—have wave-shaped contours 110.

As FIG. 3a shows, the existing first and second receptacles 105a, 105b are arranged in alternating succession along a longitudinal direction L running perpendicular to the axial direction A. The first receptacles 105a and the second receptacles 105b are located opposite one another along a transverse direction Q, which extends perpendicular to both the axial direction A and the longitudinal direction L.

In a state accommodated in the first or second receptacle 105a, 105b, the battery cell 3 in question is supported with its end face 15 directly or indirectly on the first end wall 106a and with its end face 16 directly or indirectly on the second end wall 106b (cf. FIGS. 3a, 3b), or vice versa. The individual battery cells 3 are arranged in the respective first or second receptacle 105a, 105b of the cell holder 1 in such a way that their longitudinal center axes ZLM run essentially parallel to each other and perpendicular to the two end walls 106a, 106b of the cell holder 1.

The two end walls 106a, 106b are connected to one another by means of a plurality of connecting elements 107a, 107b, 107c of the base body, which each delimit the grid openings 103 at least in sections. Each of the connecting elements 107a, 107b, 107c also partially delimits at least one first or second receptacle 105a, 105b. The connecting elements 107a, 107b, 107c and the two end walls 106a, 106b are integrally molded to each other, i.e., they are formed in one piece and of a single material. Individual, several or all of the connecting elements 107a, 107b, 107c can each be designed as a connecting strut 108a, 108b, 108c. The grid openings 103 can each have a rectangular or square geometry.

As can be seen from the figures, first connecting elements 107a, 107b, 107c or first connecting struts 108a, 108b, 108c extend along the axial direction A. Furthermore, second connecting elements 107b or second connecting struts 108b extend along the longitudinal direction L and third connecting elements 107c or third connecting struts 108c extend along the transverse direction Q. The second and third connecting elements 107b, 107c or the second and third connecting struts 108b, 108c are thus arranged in a plane E spanned by the longitudinal direction L and by the transverse direction Q, which extends orthogonally to the axial direction A.

Tolerance compensation bodies 109 can be arranged on the base body 102 facing the respective first and second receptacles 105a, 105b.

The tolerance compensation bodies 109 can be arranged, facing the respective first or second receptacle 105a, 105b, on a connecting element 107a, 107b, 107c or on a connecting strut 108a, 108b, 108c or on one of the two end walls 106a, 106b. The tolerance compensation bodies 109 can consist of an elastic material, for example an elastomer, or be designed as an elastic foam body. In this way, the tolerance compensation bodies 109 can be preloaded against the battery cell 3 accommodated in the respective first or second receptacle 105a, 105b. The design of the tolerance compensation body 109 is such that when the respective battery cell 5 accommodated in the respective receptacle 105a, 105b is pressed in a conventional or proper manner parallel to the longitudinal center axis ZLM of the cell, the respective elastic tolerance compensation body 109 is elastically deformed or compressed by at least 10%.

As already explained with reference to FIGS. 2a and 2b, the cell holders 100 together with the battery cells 3 accommodated by the respective cell holder 100 are arranged in the housing interior 5 delimited by the battery housing 4 and are supported in this state on the housing base 6 of the battery housing. The battery cells 3 arranged in the battery housing 4 by means of a respective cell holder 100 communicate fluidically with the housing interior 5 via the through-openings 103 formed in the cell holder 100, such that the temperature control medium guided through the housing interior can come into direct contact with the battery cells 3.

In the example scenario, the cell holder 100 comprises a phase change material in several areas of the cell holder 115. In the example of FIGS. 3a and 3b, these areas of the cell holder 115 are formed by heat absorption bodies 116, each of which is made of the phase change material and, as shown, each of which is arranged in one of the grid openings 103 present in the base body 102. Conveniently, as shown in FIGS. 3a and 3b, a heat absorption body 116 is provided for each of the existing first and second receptacles 105a, 105b and is accordingly arranged in a grid opening 103 formed in the base body 102, which delimits the respective receptacle 105a, 105b as part of the base body 102.

Each of the heat absorption bodies 116 may have a sheathing 117 made of a flexible material surrounding an interior 118. A filling 119 made of phase change material can be arranged in the interior. The filling 119 made from the phase change material can be in the form of a viscous gel. The phase change material can be paraffin, for example. The sheathing 117 can be materially bonded and in this way firmly connected to the base body 102 of the cell holder 100. Conveniently, the sheathing 117 can be in the form of a bag. The flexible material of the sheathing 117 can be a flexible plastic, for example polyethylene.

In a variant not shown in the example, a heat absorption body 116 may comprise a laminate which in turn comprises the phase change material or consists of the phase change material. Similarly, the filling 119 described above can be formed by such a laminate containing phase change material or from the phase change material.

As FIGS. 3a and 3b clearly show, grid openings 103 can also be formed in the base body 102 in which no heat absorption element 116 is arranged.

With regard to the use of phase change material in the base body 102 of the cell holder 100, different variants are possible. Thus, it is conceivable to dispense with phase change material in the base body 102 when providing the above-described heat absorption body 116, which is formed separately from the base body 102. Alternatively, however, it is also conceivable that certain base body sections of the base body 102 consist of a phase change material and the material of complementary base body sections does not contain any phase change material. For example, it is possible to use a phase change material for some of the connecting elements 107a, 107b, 107c or the connecting struts 108a, 108b, 108c and to select a material other than a phase change material, for example a rigid and therefore dimensionally stable plastic material, for the remaining connecting elements 107a, 107b, 107c or connecting struts 108a, 108b, 108c.

Conveniently, the cell holder 100 may abut against one of the battery cells 3 in said areas of the cell holder 115 (see FIG. 3b), so that in the event of thermal bursting of the battery cell 3, effective thermal contact of the phase change material with the battery cell 3 is ensured. It is particularly practical for the preceding heat absorption elements 116 of the cell holder 100 to rest against the neighboring battery cell 3. Similarly, at least those connecting elements 107a, 107b, 107c that consist of the phase change material or whose material contains a phase change material can rest against the neighboring battery cell 3.

If the above-described heat absorption elements 106 made of the phase change material are dispensed with in the cell holder 100, the base body 102 must consist at least in sections of phase change material or contain such a phase change material in order to ensure the provision of the areas of the cell holder 105 according to the invention, in which a phase change material is provided to form a latent heat accumulator.

The invention claimed is:

1. A cell holder for accommodating a plurality of battery cells of a traction battery, comprising:
    a base body structured in the form of a grid and formed in one piece, the base body including a plurality of grid openings arranged in a plurality of columns and a plurality of rows;
    at least two first receptacles disposed on a first side of the base body, the at least two first receptacles each configured to accommodate a single battery cell of the plurality of battery cells;
    at least two second receptacles disposed on a second side of the base body opposite the first side, the at least two second receptacles each configured to accommodate a single battery cell of the plurality of battery cells; and
    at least one area including a phase change material;
    wherein the base body further includes a first end wall and a second end wall disposed opposite one another along an axial direction of the base body and axially delimiting the at least two first receptacles and the at least two second receptacles;
    wherein the base body further includes a plurality of connecting elements connecting the first end wall and the second end wall to one another, the plurality of connecting elements delimiting the plurality of grid openings at least in sections; and
    wherein each connecting element of the plurality of connecting elements at least partially delimits a first receptacle of the at least two first receptacles and/or a second receptacle of the at least two second receptacles.

2. The cell holder according to claim 1, further comprising at least one heat absorption body arranged in the at least one area, wherein the at least one heat absorption body is different from the base body and includes the phase change material.

3. The cell holder according to claim 2, wherein the at least one heat absorption body includes:
    a sheathing, an interior surrounded by the sheathing, and a filling of the phase change material arranged in the interior; and/or
    a laminate including the phase change material.

4. The cell holder according to claim 3, wherein the at least one heat absorption body is arranged in one of the plurality of grid openings.

5. The cell holder according to claim 2, wherein:
    the at least one heat absorption body includes a sheathing, an interior surrounded by the sheathing, and a filling including the phase change material arranged in the interior; and
    the filling is a gel and/or a laminate including the phase change material.

6. The cell holder according to claim 5, wherein the sheathing is:
    configured as a bag; and/or
    composed of a plastic.

7. The cell holder according to claim 5, wherein the sheathing is connected to the base body via a material bond.

8. The cell holder according to claim 1, wherein the phase change material is one of organic paraffin and inorganic paraffin.

9. The cell holder according to claim 1, wherein the base body, at least in sections, is composed of the phase change material.

10. The cell holder according to claim 1, wherein:
    a first subset of the plurality of connecting elements are composed of the phase change material; and
    a second subset of the plurality of connecting elements do not include any of the phase change material.

11. The cell holder according to claim 1, wherein the at least two first receptacles and the at least two second receptacles are arranged following one another alternately along a longitudinal direction extending perpendicular to an axial direction of the base body.

12. The cell holder according to claim 1, wherein at least one of the plurality of connecting elements is configured as a connecting strut.

13. The cell holder according to claim 1, further comprising at least one tolerance compensation body arranged on the base body facing a respective receptacle of the at least two first receptacles and/or the at least two second receptacles, wherein the at least one tolerance compensation body is elastically deformed by at least 10% when a battery cell of the plurality of battery cells is accommodated in the respective receptacle.

14. The cell holder according to claim 1, further comprising at least one tolerance compensation body facing at least one of a first receptacle of the at least two first receptacles and a second receptacle of the at least two second receptacles, wherein the at least one tolerance compensation body is arranged on:
    a surface of the first end wall facing the second end wall; and/or
    a surface of the second end wall facing the first end wall.

15. A traction battery for a battery electric vehicle, comprising:
    at least one battery module including:
        a plurality of rechargeable electrochemical battery cells that are each configured as a cylindrical round cell;
        a battery housing surrounding a housing interior through which a temperature control medium is flowable; and
        at least one cell holder according to claim 1, the at least one cell holder arranged in the housing interior and supported on the battery housing;
    wherein a battery cell of the plurality of battery cells is arranged in at least one of a first receptacle of the at least two first receptacles and a second receptacle of the at least two second receptacles.

16. The traction battery according to claim 15, wherein the at least one cell holder includes a plurality of cell holders arranged next to each other in the housing interior.

17. The traction battery according to claim 15, wherein the plurality of battery cells, the at least two first receptacles, and/or the at least two second receptacles communicate fluidically with the housing interior via the plurality of grid openings such that the temperature control medium guided through the housing interior directly contacts the plurality of battery cells and the plurality of battery cells are immersion temperature controlled via the temperature control medium.

18. The traction battery according to claim 15, wherein:
the at least one cell holder further includes at least one tolerance compensation body facing a respective receptacle of the at least two first receptacles and/or the at least two second receptacles; and
the at least one tolerance compensation body is an elastic foam body preloaded against a battery cell of the plurality of battery cells accommodated in the respective receptacle.

19. The traction battery according to claim 15, wherein:
the plurality of battery cells each have a longitudinal center axis and two end faces facing away from each other with respect to the longitudinal center axis; and
the plurality of battery cells are each arranged in a respective receptacle of the at least two first receptacles and/or the at least two second receptacles such that the longitudinal center axes extend parallel to one another and perpendicular to the first end wall and the second end wall, a first end face of the two end faces is directly and/or indirectly disposed on and supported by the first end wall, and a second end face of the two end faces is directly and/or indirectly disposed on and supported by the second end wall.

20. The cell holder according to claim 1, wherein:
a first subset of the plurality of connecting elements extend in the axial direction; and
a second subset of the plurality of connecting elements extend transversely to the axial direction.

21. The cell holder according to claim 1, wherein the first end wall and the second end wall each include a first axial surface and an opposite second axial surface.

22. The cell holder according to claim 1, wherein the first end wall and the second end wall each project outwardly from at least one of the plurality of connecting elements in a direction extending transversely to the axial direction.

23. A traction battery for a battery electric vehicle, comprising:
at least one battery module including:
a plurality of rechargeable electrochemical battery cells that are each configured as a cylindrical round cell;
a battery housing surrounding a housing interior through which a temperature control medium is flowable; and
at least one cell holder arranged in the housing interior and supported on the battery housing;
wherein the at least one cell holder includes:
a base body structured in the form of a grid and formed in one piece, the base body including a plurality of grid openings;
at least two first receptacles disposed on a first side of the base body, the at least two first receptacles each configured to accommodate a single battery cell of the plurality of battery cells;
at least two second receptacles disposed on a second side of the base body opposite the first side, the at least two second receptacles each configured to accommodate a single battery cell of the plurality of battery cells; and
at least one area including a phase change material, the phase change material arranged at least partially in at least one of the plurality of grid openings;
wherein a battery cell of the plurality of battery cells is arranged in a first receptacle of the at least two first receptacles and/or a second receptacle of the at least two second receptacles; and
wherein the plurality of battery cells communicate fluidically with the housing interior via the plurality of grid openings such that the temperature control medium guided through the housing interior directly contacts the plurality of battery cells.

* * * * *